A. O. MOE.
FRUIT CLEANING MACHINE.
APPLICATION FILED FEB. 4, 1920.
1,357,794.
Patented Nov. 2, 1920.
4 SHEETS—SHEET 1.
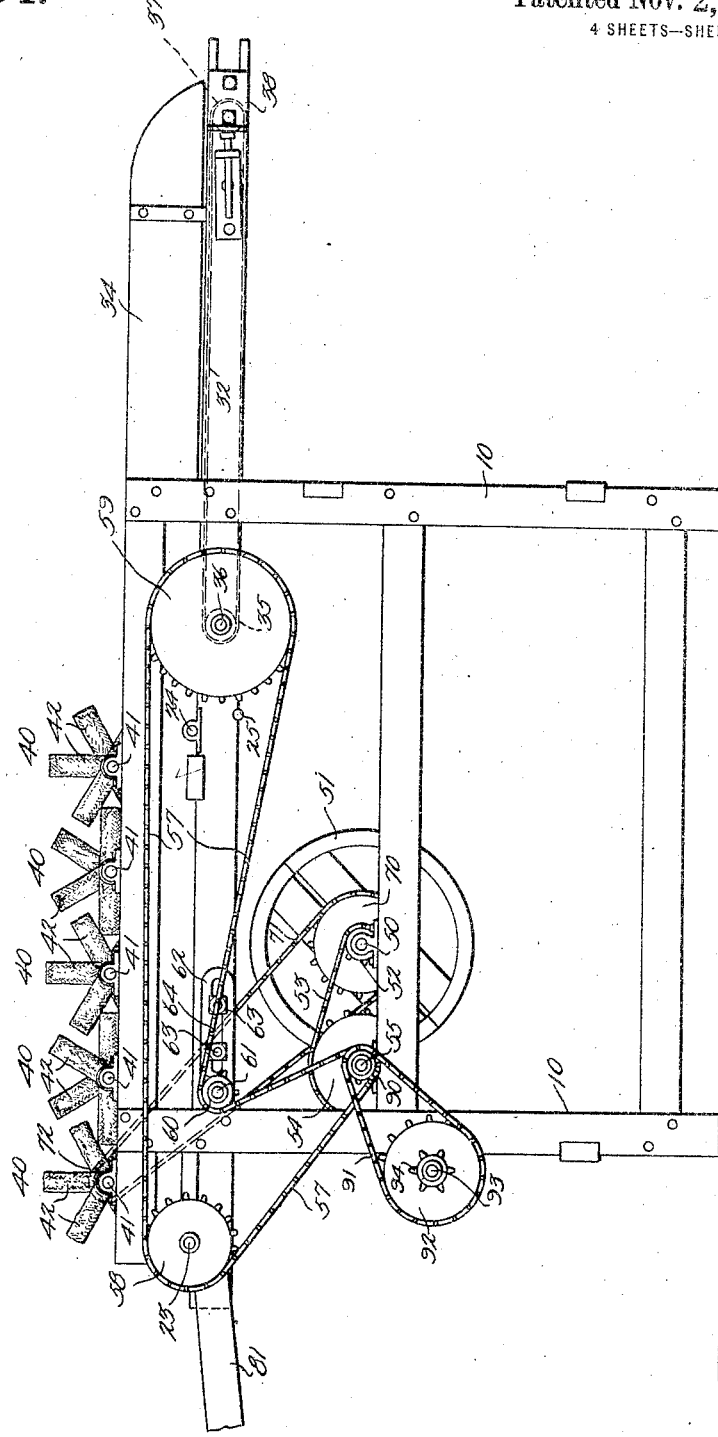
WITNESSES
INVENTOR
ANDREW O. MOE
BY
ATTORNEYS

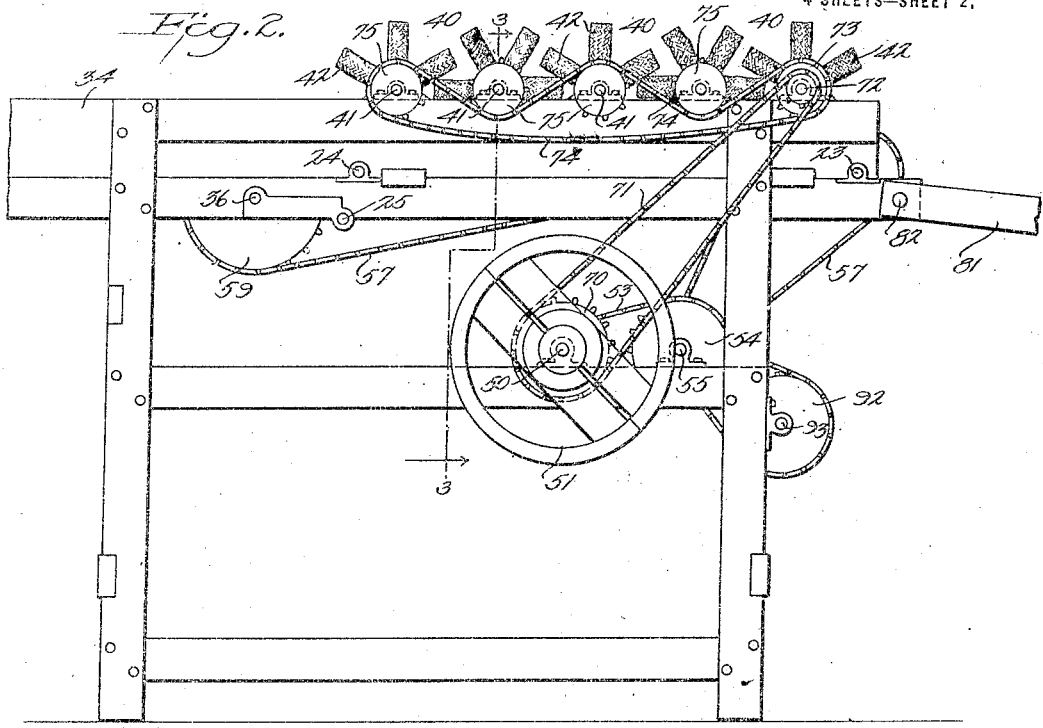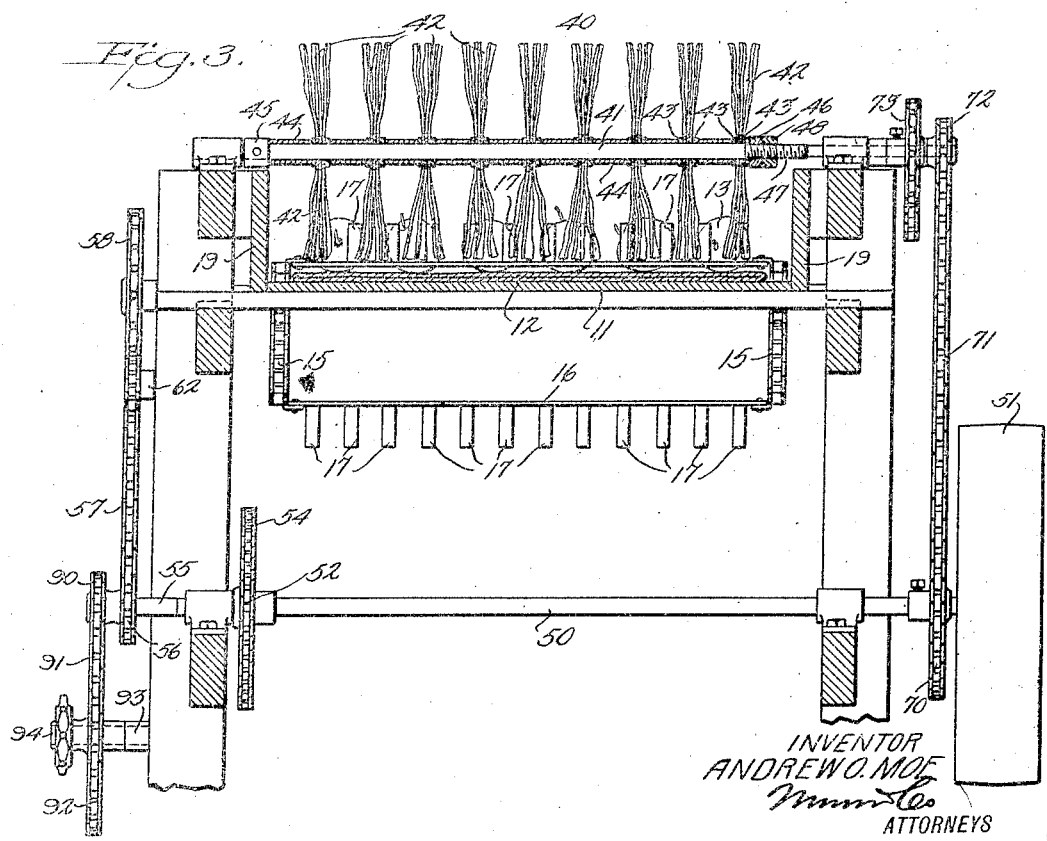

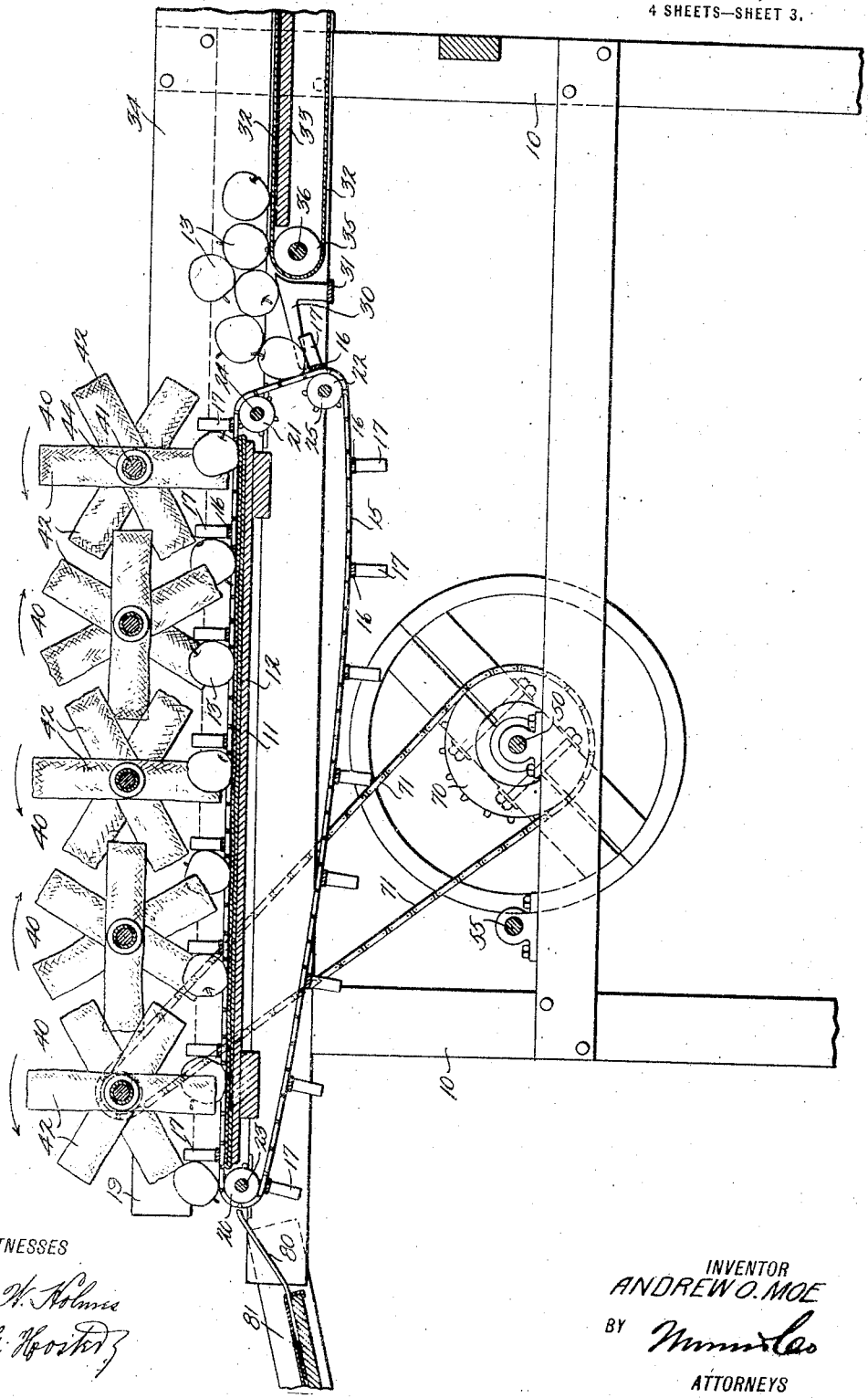

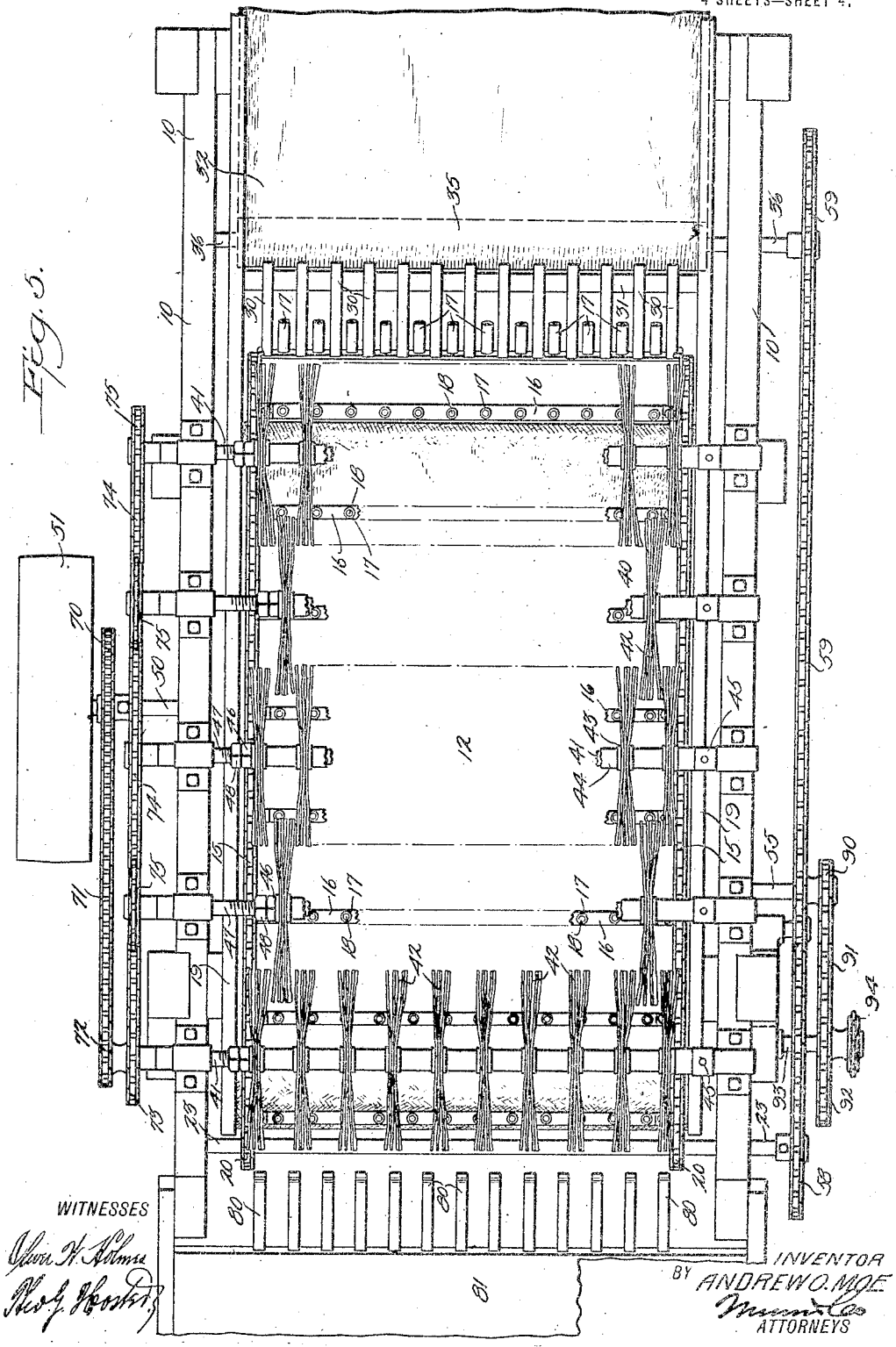

UNITED STATES PATENT OFFICE.

ANDREW O. MOE, OF TOPPENISH, WASHINGTON.

FRUIT-CLEANING MACHINE.

1,357,794.   Specification of Letters Patent.   Patented Nov. 2, 1920.

Application filed February 4, 1920. Serial No. 356,190.

*To all whom it may concern:*

Be it known that I, ANDREW O. MOE, a citizen of the United States, and a resident of Toppenish, in the county of Yakima and State of Washington, have invented a new and Improved Fruit-Cleaning Machine, of which the following is a full, clear, and exact description.

The object of the invention is to provide a new and improved fruit cleaning machine more especially designed for subjecting apples and similar fruit to an effective, repeated wiping and brushing action to insure thorough cleaning and polishing of the fruit and without danger of bruising or otherwise injuring the same.

Another object is to permit of cleaning a large number of apples in a comparatively short time.

Another object is to deliver the apples in cleaned and polished condition to the packing table for packing of the apples in boxes or crates ready for shipment.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the improved fruit cleaning machine;

Fig. 2 is a rear side elevation of the same;

Fig. 3 is an enlarged transverse section of the same on the line 3—3 of Fig. 2;

Fig. 4 is an enlarged longitudinal section of the same; and

Fig. 5 is an enlarged plan view of the same with parts of some of the wiping and brushing members shown broken out.

The improved fruit cleaning machine is mounted on a suitably constructed frame 10 supporting a table 11 provided on the top with a suitable padding 12 over which the apples 13 or other fruit to be cleaned are rolled. In order to move the apples 13 over the padded table 11 use is made of an endless conveyer comprising two sprocket chains 15 connected with each other by slats 16 each provided with spaced fingers 17 formed of short rubber tubes attached to pins 18 secured on the slats 16. The slats 16 are adapted to move over the padding 12, and the fingers 17 are spaced apart a distance somewhat less than the diameter of an apple. By the arrangement described an apple is engaged between adjacent fingers 17 and carried forward over the padding 12 of the table 11 whereby the apple by contact with the padding and the forward movement of the fingers is rolled along over the padding without danger of being bruised. It is understood that the upper runs of the sprocket chains 15 pass a distance above the top of the table 11 at the sides thereof and the latter are provided with upwardly extending guard rails 19 to prevent the apples from accidentally dropping off the sides of the table. The endless sprocket chains 15 pass around sprocket wheels 20, 21 and 22, of which the sprocket wheels 20 and 21 are secured on shafts 23, 24 located at opposite ends of the table 11 and journaled in suitable bearings arranged on the main frame 10. The sprocket wheels 22 are located a distance below and to one side of the sprocket wheels 21, as plainly shown in Fig. 4, and the said sprocket wheels 22 are secured on a transverse shaft 25 journaled in suitable bearings arranged on the main frame 10. By the arrangement described the sprocket chains 15 in their passage from the sprocket wheels 22 to the sprocket wheels 21 pass upward and forward in an inclined direction thus holding the fingers 17 in receiving position for the apples 13, to carry the latter upward onto the padding 12 of the table 11. The apples pass onto the receiving fingers by way of fixed inclined slats 30 attached to a crossbar 31 fastened to the main frame 10, and the upper ends of the said slats 30 are adjacent to the delivery end of an endless conveyer belt 32 passing with its upper run over the bottom 33 of a hopper 34 mounted on the rear end of the main frame 10. The conveyer belt 32 passes at its forward end around a roller 35 secured on a transverse shaft 36 journaled in suitable bearings arranged on the main frame 10. The rear end of the conveyer belt 32 passes over a similar roller 37 (see Fig. 1) journaled in adjustable bearings 38 arranged on the rear end of the bottom 33 of the hopper 34 in which the apples are placed by an operator or by mechanical feed means if desired. It is understood that when the machine is running, the endless conveyer belt 32 feeds the apples to the slats 30, down which the apples roll onto the fingers 17 traveling upward on the receiving end of the endless conveyer to deliver the fruit to the padding 12 and carry the same along over the padding, as previously explained.

During the time the apples 13 are carried forward over the padding 12 of the table 11, they are repeatedly subjected to combined wiping and brushing actions induced by sets of wiping and brushing members 40 arranged above the table and constructed as follows: Each of the sets of wiping and brushing members 40 is provided with a transversely extending shaft 41 journaled in suitable bearings arranged on the main frame 10, and on the said shaft 41 are secured individual wiping and brushing members each consisting of a plurality of strips 42 of cloth, felt or similar soft material, the strips 42 of each member being secured at their middle on the shaft 41, and the strips extending diametrically and at angles one relative to the other, as will be readily understood by reference to Figs. 1, 2 and 4. The strips 42 of each wiping and brushing member on each shaft 41 are pressed together at the middle by washers 43 held on the shaft 41, and the opposite washers of adjacent wiping and brushing members are engaged by spacing sleeves 44 likewise held on the shaft 41. The sleeve 44 at one end of the shaft 41 abuts against a collar 45 secured on the shaft 41, and the outermost washer 43 on the other end of the shaft is engaged by a nut 46 screwing on a threaded portion 47 formed on the shaft 41, and this nut 46 is locked in place by a jam nut 48 screwing on the threaded portion 47. By the arrangement described, the individual wiping and brushing members of each set 40 are fastened in spaced relation on the corresponding shaft 41, and the outer end portions of the strips of cloth 42 are adapted to engage the apples at the top, sides, front and rear to wipe and brush the same as the apples are moved forward and while the wiping and brushing members are rotated, thus insuring a thorough cleaning of the apples during their forward rolling over the padding 12 of the table 11. The individual wiping and brushing members of adjacent sets 40 break joint to permit of accommodating a large number of sets 40 in a comparatively short space, at the same time providing a large number of closely bunched strips of cloth 42 to insure thorough wiping and brushing of the apples during their forward rolling movement. It is further understood that by rotating adjacent sets of wiping and brushing members in opposite directions, each apple while traveling from one to the other set of wiping and brushing members is simultaneously acted on by the strips of cloth of the two sets and hence the apple is not liable to leave the padding 12, that is, is not thrown upward by the revolving wiping and brushing members. It will be noticed that the apples are thus individually wiped and brushed and are singly carried forward over the stationary padding 12 by the fingers and hence the apples are not bumped sidewise against each other and bruised.

A simultaneous traveling movement is given to the endless conveyer chains 15, and endless conveyer belt 32, and a rotary motion is given to the sets of wiping and brushing members 40, and for this purpose the following arrangement is made: On the main shaft 50 is secured a pulley 51 connected by a belt with other machinery for rotating the main shaft 50. On the shaft 50 is secured a sprocket wheel 52 (see Fig. 1) connected by a sprocket chain 53 with a sprocket wheel 54 secured on a transverse shaft 55 journaled on the main frame 10. On the shaft 55 is secured a sprocket wheel 56 (see Fig. 3) connected by a sprocket chain 57 with sprocket wheels 58 and 59, of which the sprocket wheel 58 is secured on the shaft 23 and the sprocket wheel 59 is secured on the shaft 36. The sprocket chain 57 also passes around a tightening sprocket wheel 60 having its shaft 61 journaled in a bracket 62 adjustably fastened by bolts 63 to the main frame 10. The bolts 63 extend through a slot 64 formed in the bracket 62 to allow of adjusting the latter with a view to hold the sprocket chain 57 under the desired tension. It will be noticed that when the main shaft 50 is driven, a rotary motion is transmitted to the shaft 55 which by the sprocket chain 57 and the sprocket wheels 56, 58 and 59 imparts a traveling motion to the chains 15 and a similar motion to the conveyer belt 32.

In order to drive the shafts 41 of the sets of wiping and brushing members 40, the following arrangement is made: On the main shaft 50 is secured a sprocket wheel 70 connected by a sprocket chain 71 with a sprocket wheel 72 secured on the shaft 41 of the set of wiping and brushing members 40 at the delivery end of the machine. On this shaft 41 is secured a sprocket wheel 73 around which passes a sprocket chain 74 passing alternately under and over sprocket wheels 75 secured on the other shafts 41, and hence when the machine is running the rotary motion of the main shaft 50 is transmitted by the gearing described to the several sets of wiping and brushing members 40 to rotate the same in unison and successive sets in opposite directions, as plainly indicated by the arrows in Fig. 4.

The apples after being cleaned and polished are pushed by the corresponding fingers 17 over the delivery end of the table 11 onto downwardly and forwardly inclined slats 80 connected with the upper end of a packing table 81 from which the apples are removed and packed into boxes or crates ready for shipment. The packing table 81 is connected by suitable attaching means 82 to the forward end of the main frame 10, as indicated in Fig. 2. On the shaft 55 is secured a sprocket wheel 90 connected by a sprocket chain 91 with a sprocket wheel 92 secured on the shaft 93 journaled on the main frame 10, and on this sprocket shaft 93 is secured a sprocket wheel 94 adapted to be connected by a sprocket chain with a conveyer belt (not shown) connected with the packing table 81 for carrying the cleaned and polished fruit to within convenient reach of the packers.

It is understood that by the arrangement described, the apples are repeatedly subjected to wiping and brushing actions by the flexible strips 42 of the several sets of wiping and brushing members 40 and while the apples are carried along over the padding 12 of the table 11 and are rolled along by contact with the padding, and are being pushed forward by the fingers 17.

Having thus described my invention, I claim as new and desire to secure by Letters Patent:—

1. In a fruit wiping machine, the combination with a supporting frame, of a stationary wiping surface and upon which the fruit rests, means movable over the table for engaging the fruit to advance and roll it upon the wiping surface, and means consisting of a plurality of separate, power-driven wiping devices operating on that portion of the surface of the fruit not engaging the stationary wiping surface.

2. In a fruit wiping machine, the combination with a supporting frame or table, of a stationary wiping surface supported thereon and upon which the fruit rests, means for imparting a movement of translation and rotation to the fruit, and a series of independent, power-driven wiping devices located adjacent the path of said fruit pieces in a plane opposite said stationary wiping surfaces, said devices adapted to be simultaneously rotated and to engage the complementary surface of said fruit pieces.

3. In a fruit cleaning machine, a table, an endless traveling conveyer having transverse slats and adapted to travel over the said table, said slats being spaced apart a distance to allow the fruit to rest upon the table and provided with spaced members adapted to engage the fruit to roll the same along over the said table, and revoluble wiping and brushing members formed of strips of cloth adapted to wipe and brush the fruit as the latter is carried along over the table.

4. In a fruit cleaning machine, a padded table, an endless traveling conveyer having spaced transverse slots extending across the padded table and spaced from the same, each slat being provided with spaced padded carrying pins adapted to carry the apples along over the padded table, and revoluble wiping and brushing members above the said table and adapted to wipe and brush the apples as they are rolled along over the table by the said pins.

5. In a fruit cleaning machine, a padded table, an endless traveling conveyer having spaced transverse slats extending across the padded table and spaced from the same, each slat being provided with spaced padded carrying pins adapted to carry the apples along over the padded table, revoluble wiping and brushing members above the said table and adapted to wipe and brush the apples as they are rolled along over the table by the said pins, and means to rotate successive wiping and brushing members in opposite directions.

6. In a fruit cleaning machine, a padded table, an endless traveling conveyer having transverse slats adapted to pass over the said table, the slats having spaced pins adapted to engage the fruit and roll the same along over the table, a plurality of transverse shafts above the table and each provided with spaced wiping and brushing members, each wiping and brushing member being formed of diametrically disposed strips of cloth extending at an angle one to the other, the end portions of the strips being adapted to wipe and brush the fruit as the latter is rolled along over the table, and means rotating the said shafts.

7. In a fruit cleaning machine, a padded table, an endless traveling conveyer having transverse slats adapted to pass over the said table, the slats having spaced pins adapted to engage the fruit and roll the same along over the table, a plurality of transverse shafts above the table and each provided with spaced wiping and brushing members, each wiping and brushing member being formed of diametrically disposed strips of cloth extending at an angle one to the other, the end portions of the strips being adapted to wipe and brush the fruit as the latter is rolled along over the table, and means rotating the said shafts in unison and successive shafts in opposite directions.

8. In a fruit cleaning machine, the combination with a padded table of an endless traveling conveyer composed of a series of separated transverse slats extending across said table and elevated above the same, each slat provided with a series of fixed carrying members adapted to push the fruit over the padded surface in contact therewith, a series of rotatable wiping and brushing devices located in a plane parallel to said padded surface above said members, said devices adapted to wipe and brush the fruit pieces as they are rolled along over the padded surface by said members, and means to rotate successive wiping and brushing devices in respectively opposite directions.

9. In a fruit cleaning machine, a padded table, an endless traveling conveyer having transverse slats adapted to pass over the said table, the table having spaced pins adapted to engage the fruit and roll the same along over the table, a plurality of transverse shafts above the table and each provided with spaced wiping and brushing members, each wiping and brushing member being formed of diametrically disposed strips of cloth extending at an angle one to the other, the end portions of the strips being adapted to wipe and brush the fruit as the latter is rolled along over the table, a feed belt delivering the fruit to the pins on a slat as the latter moves up onto one end of the table, a main shaft, means connecting the said main shaft with the said shafts carrying the wiping and brushing members, means connecting the said main shaft with the said endless conveyer, and means connecting the said main shaft with the said feed belt.

10. In a fruit cleaning machine, a revoluble wiping and brushing member formed of a driven shaft, and a plurality of strips of cloth held diametrically on the said shaft and arranged at an angle one relative to the other, the strips of cloth extending approximately in a plane at an angle to the axis of the shaft, the middle portions of the strips overlying one another, the outer portions being adapted to spread to wipe and brush the fruit.

11. In a fruit cleaning machine, the combination of a traveling conveyer, including chains, transverse slats attached to coincident points in two parallel runs of said chains, a series of spaced fingers fixed at a right angle on the slats, a table, means for imparting an advance motion to said conveyer, means for guiding the upper runs of said conveyer chains and slats over and across said table and to extend the chains in an inclined position upward to the entrance end of the table, fixed slats extending downward to the slat fingers on the inclined portion of said chain, and a conveyer belt adapted to deliver the fruit to be cleaned to the upper ends of said fixed slats.

ANDREW O. MOE.